United States Patent [19]

Marshall

[11] Patent Number: 4,620,732
[45] Date of Patent: Nov. 4, 1986

[54] BOLT FRAME CONSTRUCTION
[75] Inventor: Daniel Q. Marshall, Cincinnati, Ohio
[73] Assignee: The United States of America as represented by the Secretary of the Air Force, Washington, D.C.
[21] Appl. No.: 798,042
[22] Filed: Nov. 14, 1985
[51] Int. Cl.⁴ ............................................. F16L 23/00
[52] U.S. Cl. ................... 285/368; 285/412; 285/405
[58] Field of Search ............... 285/368, 365, 412, 409, 285/405

[56] References Cited

U.S. PATENT DOCUMENTS

| 253,482 | 2/1982 | Mixer | 285/368 X |
|---|---|---|---|
| 1,185,487 | 5/1916 | Eastman | 285/409 X |
| 2,457,077 | 12/1948 | Woolsey | 285/367 X |
| 2,769,648 | 11/1956 | Herman | 285/366 X |
| 3,141,686 | 7/1964 | Smith et al. | 285/368 X |
| 3,466,070 | 9/1969 | Spencer | 285/405 |
| 4,432,572 | 2/1984 | Thalmann | 285/412 |
| 4,496,176 | 1/1985 | Weinhold | 285/409 X |

Primary Examiner—Richard J. Scanlan, Jr.
Attorney, Agent, or Firm—Donald J. Singer; William G. Auton

[57] ABSTRACT

The coupling together of the ends of two sections of pipes is accomplished using a pair of externally mating flanges, a plurality of nut and bolt assemblies, and a split, u-shaped positioning ring which surrounds the mating flanges. The flanges each surround the peripheral surface adjacent to a collar at the ends of the pipe sections, and have a plurality of spaced radial notches around their perimeter. The positioning ring has pairs of inwardly protruding tabs spaced about its circumference to align with the radial notches of the two flanges. Each pair of tabs has an orifice holding the loosely preassembled nut and bolt assemblies which are all slid into their corresponding notches in the flanges at once when the clamping ring is placed over the flanges. Subsequent tightening of the nut and bolt assemblies press the mating flanges together against a seal placed therebetween to prevent leakage from the coupling.

4 Claims, 6 Drawing Figures

BOLT FRAME CONSTRUCTION

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to pipe couplings, and specifically to a bolted flange assembly with a radial distribution of recessed tabs for connecting flanged sections of pipes together.

It is a common practice to mount a section of pipe to another section by means of flanges, which are attached to the ends of each section and clamped together. Bolted flanges are preferred for large pressurized lines since they establish a tight seal between the pipe sections and serve to align the sections along a common axis.

The protrusion of bolts around the circumference of the flanges presents a disadvantage in environments where space is limited. The task of providing a suitable means of connecting sections of pipe together is alleviated, to some degree by the following U.S. patents, which are incorporated herein by reference:

U.S. Pat. No. 253,482 issued to Mixer on Feb. 7, 1882;
U.S. Pat. No. 2,457,077 issued to Woolsey on Dec. 21, 1948;
U.S. Pat. No. 2,769,648 issued to Herman on Nov. 6, 1956;
U.S. Pat. No. 3,141,686 issued to Smith et al on July 21, 1964;
U.S. Pat. No. 3,466,070 issued to Spencer on Sept. 9, 1969; and
U S. Pat. No. 4,496,176 issued to Weinhold on Jan. 29, 1985.

The patents to MIXER, SMITH et al and SPENCER all illustrate pipe connections which use axially aligned bolts around the joint through flanges on the pipe. The axially aligned bolted flanges of these inventions provided an excellent means of mechanically connecting sections of pipe together. However, each individual bolt presents an external protrusion, which remains the present concern. These individual bolts may be difficult to fit into their individual slots in the flanges in situations where space is limited.

The patents of Woolsey, Herman and Weinhold all use a split clamp ring, which encompasses the mating flanges. While this is an improvement, the inventions of these references have a single locking means, such as a bolt, which forms a means of connecting the flanges together that lacks the strength of the radial distribution of axially aligned bolts. The Weinhold reference is unique in that it discloses a toggle latch which encompasses and holds together mating flanges. However, like the Woolsey, Herman and Weinhold references, the toggle latch connects flanges in a manner which may lack the strength of axially aligned bolts.

In view of the foregoing discussion, it is apparent that there currently exists the need for a means of connecting together sections of pipe which retains the advantages of the strength of axially aligned bolts, and facilitates the insertion of such bolts into the slots of flanges where space is limited. The present invention is intended to satisfy that need.

SUMMARY OF THE INVENTION

The subject invention is a flanged pipe connection for large pressurized conduits wherein the space surrounding the joint is limited and would either preclude the use of conventional bolted connecting means or cause difficulty in the connecting or disconnecting operation.

The coupling of sections of pipes, in the present invention, is accomplished by using: external mating flanges on the ends of the pipes to be joined, a plurality of spaced, axially aligned notches in the periphery of the flanges, a split, generally "U" shaped positioning ring surrounding the mating flanges when the pipes are joined, the positioning ring having two rows of spaced, inwardly protruding tabs corresponding to the notches and a circumferentially elongated bolt hole through each of the tabs whereby axially aligned, loosely preassembled bolt and nut assemblies are supported to facilitate installation of the ring and subsequent tightening of the bolt and nut assemblies to draw the mating flanges together.

It is a principal object of the present invention to provide a pipe coupling using a radial distribution of recessed flange connections which minimize intrusion into the space surrounding the pipe.

It is another object of the present invention to establish a tight seal between the pipe sections and prevent leakage around any gasket or packing.

It is another object of the present invention to provide a mechanical connection between pipe sections so as to align them on a common axis.

It is another object of the present invention to permit installation of bolts and nuts on flanged connections where space is limited.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention provides a means of connecting flanged sections of pipe together where space is limited. Bolted flanges are preferred for large pressurized lines since the flanges can be torqued together by the radial distributions of bolts to ensure a tight seal.

Figure 1:
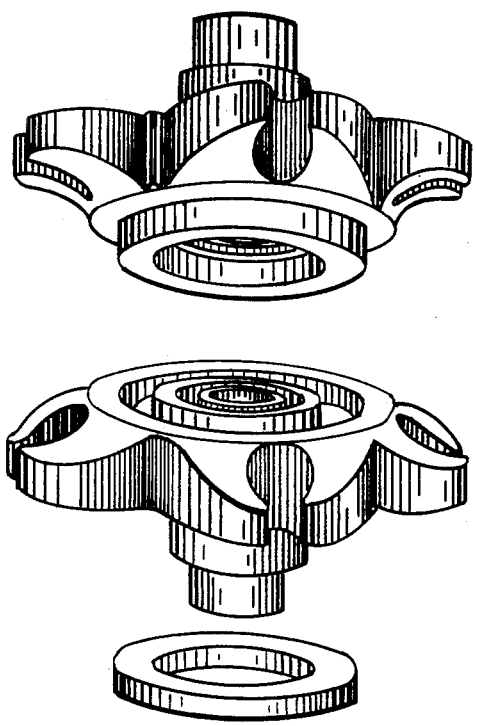
FIG. 1 is an illustration of a prior art pipe coupling system.

FIG. 1 is a prior art example of two sections of pipe with flanged ends which may be bolted together to form a strong seal to serve as part of a pressurized line. FIG. 1 originally was presented as part of the Mixer reference.

Figure 2:
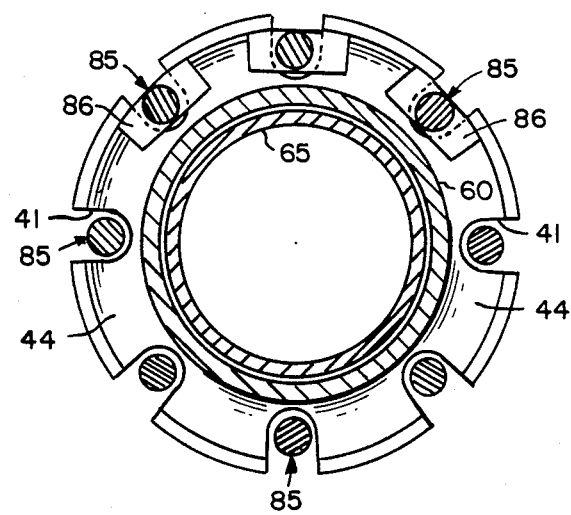
FIG. 2 is an illustration of a prior art flange.

FIG. 2 is a view of a prior art flange, from the Smith reference which is commonly used to terminate the ends of pipe sections. The flange 44 has a plurality of radial slots 41 through which axially aligned bolts 85 are inserted. While these bolts provide an optimum seal between the sections of pipe, the individual bolts may be difficult to insert in all their respective slots in environments where space is limited.

Figure 3:
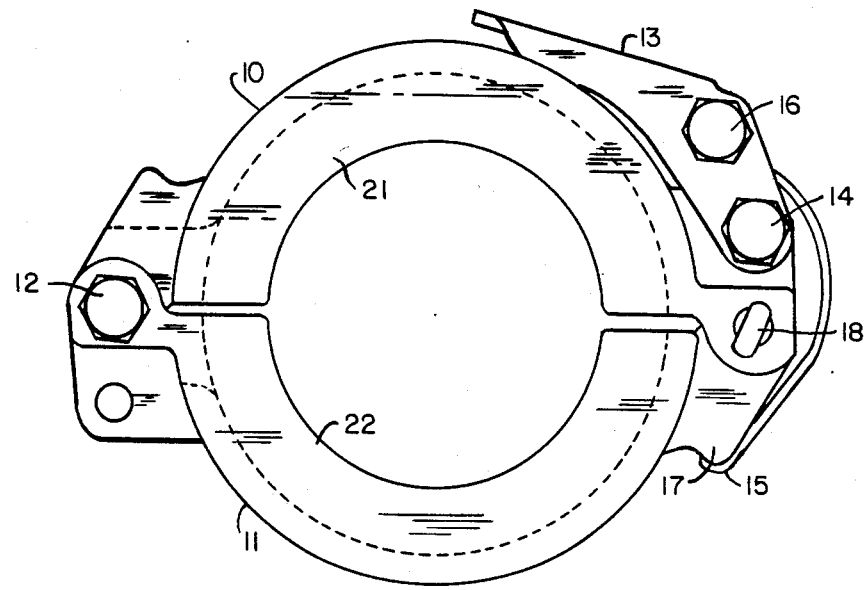
FIG. 3 is a prior art split positioning ring used as a pipe coupling system.

FIG. 3 is a solution presented in the Weinhold reference. Weinhold provides a split ring clamp that may be fitted over flanged sections and latched close. While this is a solution to environments where space is limited, the advantages of the use of axially aligned bolts to ensure a tight seal is lost. As mentioned above, bolted flanges are preferred for pressurized lines since they may be torqued down in a manner that prevents leakage around the gasket or packing between pipe sections.

The bolted frame construction of the present invention combines the advantages of a radial distribution of axially aligned bolts with the ease of application of a clamp. The coupling of sections of pipe is accomplished using a set of mating flanges on the end of pipes to be joined; a split, u-shaped positioning ring; and a plurality of nut and bolt assemblies.

Figure 4:
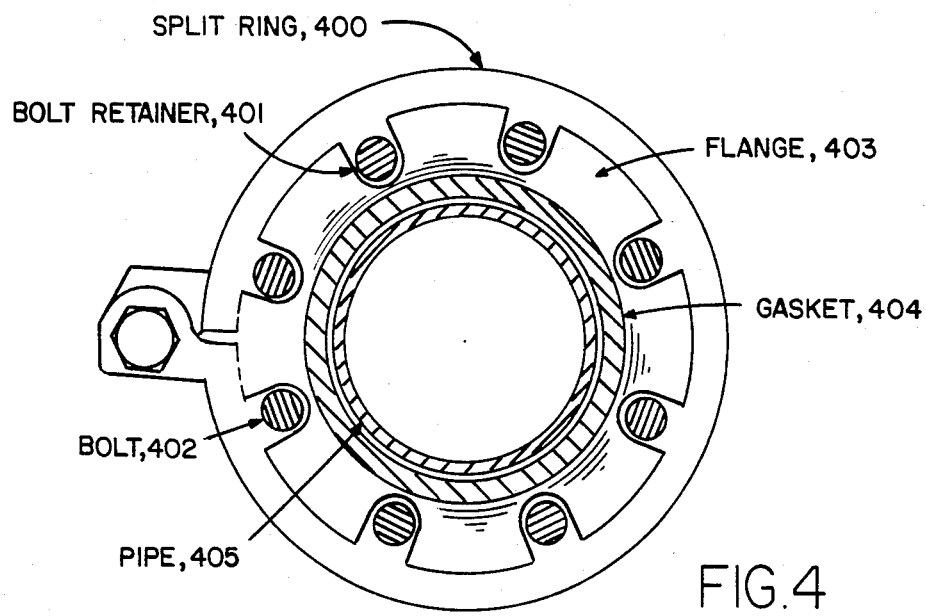
FIG. 4 is an illustration of the split ring clamp of one embodiment of the present invention.

Each flange has a plurality of axially aligned notches around its outer perimeter, as in the prior art flange of FIG. 2. FIG. 4 is an illustration of the split, U-shaped positioning ring of the present invention. Similar to the split ring of FIG. 3, the u-shaped positioning ring fits over the sides of two mating flanges. However, the ring of the present invention has two rows of spaced, inwardly protruding tabs which support a loosely preassembled bolt and nut assembly which fits into each of the notches around the perimeter of the mating flanges.

The process of connecting sections of pipe together is greatly sinplified with the present invention. First, flanges on the ends of the sections of the pipes are pushed together. Then the positioning ring is placed over the flanges so that all the loose nut and bolt assemblies are held in place within the aligned notches around the perimeter of the flanges. Finally, each bolt is tightened in the conventional manner.

Figure 5:
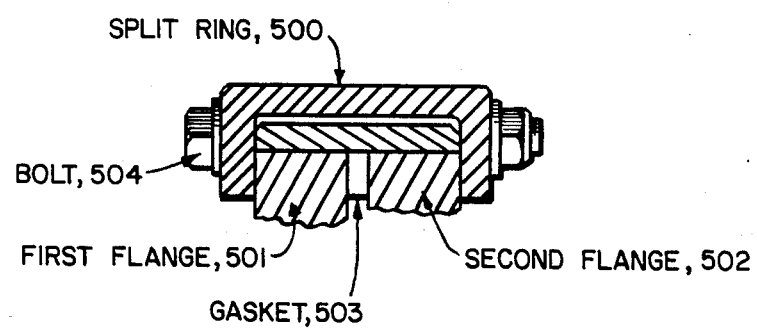
FIG. 5 is a view of a section of the split positioning ring of FIG. 4.

FIG. 5 is a view of a section of the u-shaped positioning ring of FIG. 4. The purpose of FIG. 5 is to illustrate a pair of parallel tabs which hold the loosely preassembled bolt and nut in position in a notch of a pair of mating flanges.

Figure 6:
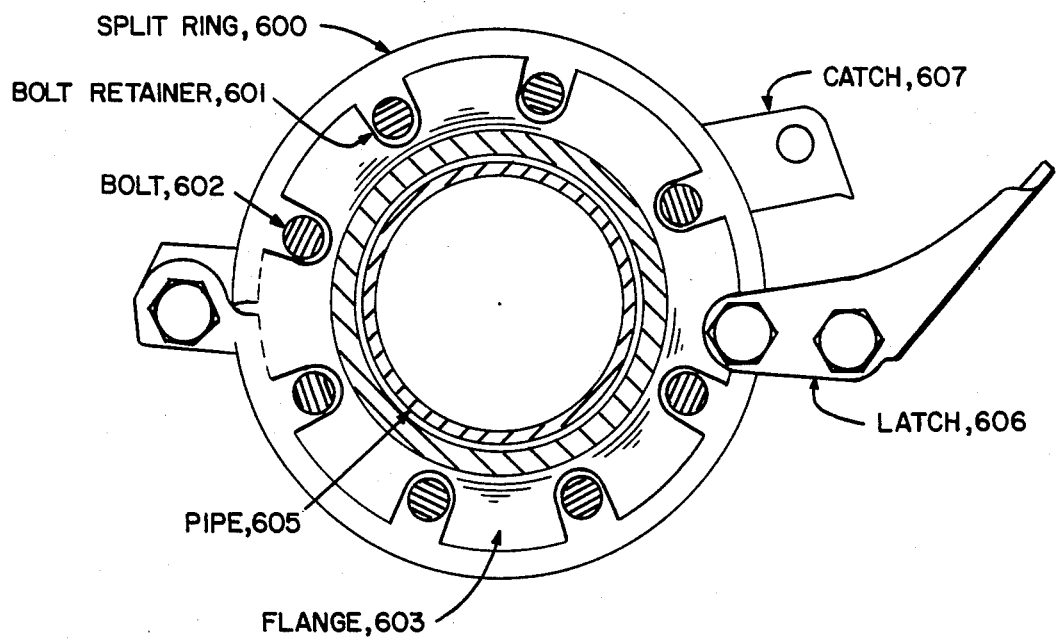
FIG. 6 is a view of the split positioning ring of the preferred embodiment of the present invention.

FIG. 6 is a view of the preferred embodiment of the split, U-shaped positioning ring of FIG. 4. As illustrated, the embodixent of FIG. 6 includes a latch and catch which allows the ring to be latched in place around the flanges. The latch serves to hold the ring in position until the bolts are tightened up.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An apparatus for coupling the ends of two sections of pipe together said apparatus comprising:
   first and second mating flanges, each on the ends of one of the sections of pipe and each having a plurality of spaced radial notches around its perimeter; the notches on said first mating flange being aligned with the notches on the second mating flange;
   a means for sealing said first and second mating flanges when they are pressed together, said sealing means being compressed between said first and second mating flanges to prevent leakage when the sections of pipes are connected by the coupling apparatus;
   a plurality of nut and bolt assemblies; and
   a split positioning ring which is fitted over the first and second mating flanges with the sealing means therebetween, said split positioning ring having two rows of spaced, inwardly protruding tabs which form pairs of tabs which are aligned with and encompass the plurality of spaced radial notches around the perimeter of the first and second mating flanges, each of the tabs having an orifice which holds one of the nut and bolt assemblies in place in the spaced radial notches.

2. A coupling apparatus, as defined in claim 1, wherein the split positioning ring includes a latch which holds it in position around the first and second mating flanges.

3. A process of coupling two sections of pipe together, each of the sections having one end with a collar and a flange surrounding its peripheral surface, each of the flanges having a plurality of spaced radial notches around its perimeter such that when the two flanges are held pressed together by a plurality of axially aligned nut and bolt assemblies, which hold the flanges together with a seal therebetween, leakage is prevented by said coupling, said process comprising the steps of:
   aligning the notches around the perimeter of the two flanges with each other;
   pressing the two flanges together with the seal therebetween;
   fitting a split positioning ring over the two flanges, said split positioning ring having pair of tabs holding loosely preassembled nut and bolt assemblies in place in each of the spaced radial notches around the perimeters of the two flanges; and
   tightening each of the nut and bolt assemblies to firmly press the two flanges together with the seal therebetween.

4. A process, as defined in claim 3 including a latching step, said latching step occuring after the fitting step and comprising:
   latching the split positioning ring in position by closing a latch between the split in the positioning ring, said latch thereby tightening the positioning ring about the two flanges and firmly holding the loosely preassembled nut and bolt assemblies in position in the notches around the perimeters of the two flanges.

* * * * *